W. P. HANSELL.
Car Spring.

No. 201,523. Patented March 19, 1878.

Attest:
H. L. Perrine.
Floyd Norris.

Walter P. Hansell
Inventor.
By Johnson & Johnson
Atty's

UNITED STATES PATENT OFFICE.

WALTER P. HANSELL, OF PITTSBURG, PENNSYLVANIA.

IMPROVEMENT IN CAR-SPRINGS.

Specification forming part of Letters Patent No. 201,523, dated March 19, 1878; application filed January 28, 1878.

*To all whom it may concern:*

Be it known that I, WALTER P. HANSELL, of Pittsburg, in the county of Allegheny and State of Pennsylvania, have invented certain new and useful Improvements in Car-Springs; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of the improvement is to obtain a spring that will act at all times, whether the load be heavy or light, and this without affecting injuriously any part of the spring. This object I effect by arranging between two spiral springs the meeting ends whereof have cupped plates, with their rims adapted to meet and prevent the crushing of, a rubber disk inclosed by their walls. The rubber disk may be in the middle of the spiral spring proper, or there may be one at each end thereof, held by the cupped bearing-plates.

Figure 1:
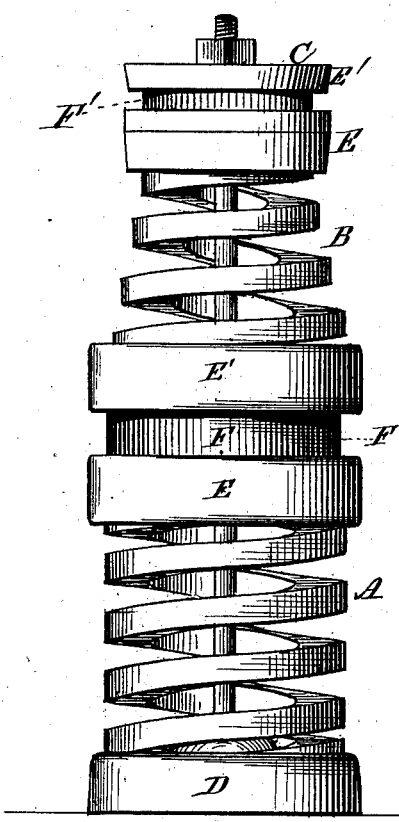
Figure 2:
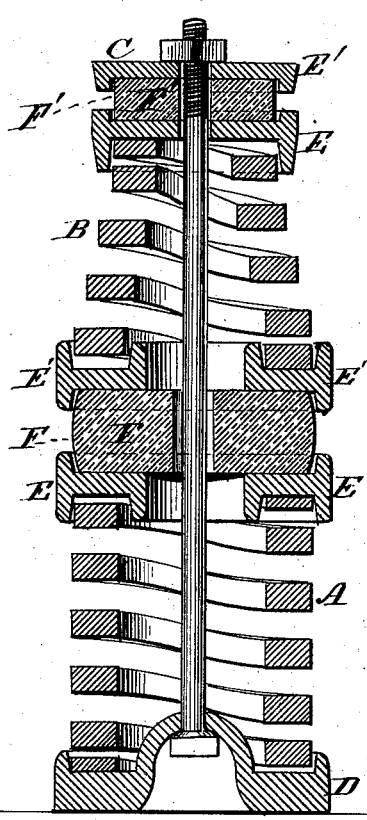

Referring to the drawings, Figure 1 represents an elevation of a spring embracing my invention; Fig. 2, a vertical section of the same, and Fig. 3 a view showing the rubber under pressure and the cup-edges nearly meeting.

The spring may be a common cylindrical spiral spring; or, when two are used, as shown, one, A, may be cylindrical, and the other, B, helical, or both may be helical, the specific form and number not being material.

The spring or springs are mounted in the usual top and bottom cup-bearers C D, and they may be connected by the usual through connecting bolt or rod.

Capping the spring A is a metallic bearing-plate, E, and upon this is seated a rubber disk, F, of suitable thickness, which is capped in turn by another bearing-plate, E', to support the upper spring B when used, and for the purpose of acting in conjunction with the plate E, to compress the rubber disk under the action of light and medium loads.

Figure 3:
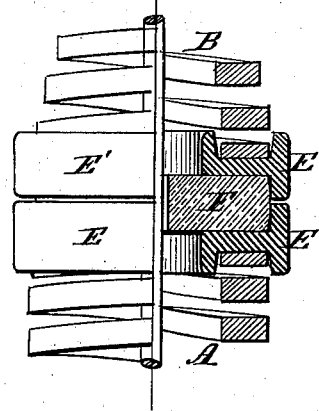

The metallic bearing-plates E E' are cupped on both sides, to form holding-seats for the spring, and to limit their meeting action upon the interposed rubber disk, so as to prevent undue strain upon the rubber disk, which might crush or split it and render it useless. The relation of the depths of these cups in the plates is such to the thickness of the rubber disk as to effect this result so desired. For instance, if the rubber disk be three inches in thickness, the cups should be each an inch in depth. This would allow one inch of rest for the rubber disk when the edges of the cups meet, the pressure being then transferred to the spiral spring, as shown in Fig. 3.

These metallic plates E E' and rubber disk F may be placed only at the junction of springs A B, as shown in the drawings, or supplemented by plates and disks at top and bottom, the said plates being in pairs; or I may use one or more springs. It is thus that I obtain different degrees of strength from different materials, for, the rubber being the most pliable, it will act under the least pressure. Then, when greater strain is exerted, the spring or springs commence to act in combination with the rubber disk or disks; and it is not until the cup-edges of the plates meet that the rubber ceases to act, and the pressure is on the spring only.

My springs may be made single or may be grouped together.

I claim—

1. The arrangement between two spiral springs, one imposed on the other, of a rubber disk, F, in combination with cup-holders E E', adapted to meet under heavy loads, and prevent the crushing of the rubber disk, as set forth.

2. The spirals A B, seated upon the cupped bearing-plates E E', the interposed rubber disk protected by meeting edges of the said bearing-plates, in combination with the end bearing-plates and rubber disks, all constructed and arranged as specified.

In testimony that I claim the foregoing I have affixed my signature in the presence of two witnesses.

WALTER P. HANSELL.

Witnesses:
JAMES B. COYLE,
A. E. H. JOHNSON.